United States Patent
Kumar et al.

(10) Patent No.: US 11,376,562 B2
(45) Date of Patent: Jul. 5, 2022

(54) ADSORBENT COMPOSITION FOR THE REMOVAL OF CHLORIDES FROM HYDROCARBON

(71) Applicant: RELIANCE INDUSTRIES LIMITED, Mumbai (IN)

(72) Inventors: Satish Kumar, Gurgaon (IN); Satish Dasharath Shewale, Navi Mumbai (IN); Vijayalaxmi Ravi Puranik, Vadodara (IN); Prakash Kumar, Vadodara (IN); Raksh Vir Jasra, Vadodara (IN)

(73) Assignee: RELIANCE INDUSTRIES LIMITED, Mumbai (IN)

( * ) Notice: Subject to any disclaimer, the term of this patent is extended or adjusted under 35 U.S.C. 154(b) by 333 days.

(21) Appl. No.: 16/485,252

(22) PCT Filed: Feb. 21, 2018

(86) PCT No.: PCT/IB2018/051043
§ 371 (c)(1),
(2) Date: Aug. 12, 2019

(87) PCT Pub. No.: WO2018/154443
PCT Pub. Date: Aug. 30, 2018

(65) Prior Publication Data
US 2019/0374927 A1    Dec. 12, 2019

(30) Foreign Application Priority Data
Feb. 24, 2017    (IN) .............. 201721006641

(51) Int. Cl.
| | | |
|---|---|---|
| *B01J 20/08* | (2006.01) | |
| *B01J 20/18* | (2006.01) | |
| *B01D 53/04* | (2006.01) | |
| *B01J 20/12* | (2006.01) | |
| *B01J 20/28* | (2006.01) | |
| *B01J 20/30* | (2006.01) | |
| *B01J 20/32* | (2006.01) | |
| *C10G 25/00* | (2006.01) | |
| *C10G 25/05* | (2006.01) | |

(52) U.S. Cl.
CPC .............. *B01J 20/18* (2013.01); *B01D 53/04* (2013.01); *B01J 20/08* (2013.01); *B01J 20/12* (2013.01); *B01J 20/2803* (2013.01); *B01J 20/28011* (2013.01); *B01J 20/28019* (2013.01); *B01J 20/28042* (2013.01); *B01J 20/28061* (2013.01); *B01J 20/28083* (2013.01); *B01J 20/3007* (2013.01); *B01J 20/3028* (2013.01); *B01J 20/3042* (2013.01); *B01J 20/3078* (2013.01); *B01J 20/3204* (2013.01); *B01J 20/3236* (2013.01); *C10G 25/003* (2013.01); *C10G 25/05* (2013.01); *B01D 2253/104* (2013.01); *B01D 2253/108* (2013.01); *B01D 2253/11* (2013.01); *B01D 2253/25* (2013.01); *B01D 2253/306* (2013.01); *B01D 2253/308* (2013.01); *B01D 2253/34* (2013.01); *B01D 2256/24* (2013.01); *B01D 2257/204* (2013.01); *C10G 2300/201* (2013.01)

(58) Field of Classification Search
CPC ...... B01J 20/08; B01J 20/12; B01J 20/28011; B01J 20/28019; B01J 20/2803; B01J 20/28042; B01J 20/28061; B01J 20/28083; B01J 20/3007; B01J 20/3028; B01J 20/3042; B01J 20/3078; B01J 20/3204; B01J 20/3236; B01D 53/04; B01D 2253/104; B01D 2253/108; B01D 2253/11; B01D 2253/25; B01D 2253/306; B01D 2253/308; B01D 2253/34; B01D 2253/24; B01D 2257/204; C10G 25/003; C10G 25/05; C10G 2300/201
USPC .......................................................... 502/8
See application file for complete search history.

(56) References Cited

U.S. PATENT DOCUMENTS 4,228,036 A    10/1980    Swift
4,762,537 A    8/1988    Fleming et al.

OTHER PUBLICATIONS

ISR for International Application PCT/IB2018/051043.
Written Opinion for International Application PCT/IB2018/051043.

*Primary Examiner* — Edward M Johnson
(74) *Attorney, Agent, or Firm* — Ladas & Parry LLP

(57) ABSTRACT

An adsorbent composition for removing chlorides from hydrocarbon includes an adsorbent matrix and a metallic component. The metallic component forms an intimate complex with the adsorbent matrix. The adsorbent composition is characterized by pore size in the range of 20 Å to 120 Å. It is found that the amount of chlorides removed by the adsorbent composition from the hydrocarbon is in the range of 0.020 wt. % to 0.047 wt. %.

19 Claims, No Drawings

ADSORBENT COMPOSITION FOR THE REMOVAL OF CHLORIDES FROM HYDROCARBON

RELATED APPLICATION

This application is a national phase entry under 35 USC 371 of International Patent Application No.: PCT/IB2018/051043 filed on 21 Feb. 2018, which claims priority from Indian Application No. 201721006641 filed on 24 Feb. 2017, the disclosures of which are incorporated in their entirety by reference herein.

FIELD

The present disclosure relates to an adsorbent composition for the removal of chlorides from hydrocarbon mixtures.

BACKGROUND

Hydrocarbon mixtures obtained from refinery processes usually get contaminated with chloride ions due to the various organic and inorganic chloride compounds used during field processes. The common problems associated with the presence of chloride ions in the hydrocarbon are (i) formation and deposition of ammonium chloride; (ii) corrosion of the processing equipment; (iii) poisoning of downstream catalysts/promoters; and (iv) product specification issues.

Catalytic dehydrochlorination is one of the commonly used techniques for removing the inorganic and organic chlorides from the hydrocarbon, wherein the hydrogen chloride is produced at the end of the process which is removed by caustic treatment. However, during the process of catalytic dehydrochlorination, the reducible components of the hydrocarbon, such as unsaturated or oxygenated compounds may undergo undesirable reaction. Further, catalytic dehydrochlorination is a complex and expensive process in terms of reactants, equipment used and process controls.

There is, therefore, felt a need to provide a medium for effective removal of chlorides from hydrocarbon while avoiding the above mentioned issues.

OBJECTS

Some of the objects of the present disclosure, which at least one embodiment herein satisfies, are as follows:

It is an object of the present disclosure to ameliorate one or more problems of the prior art or to at least provide a useful alternative.

An object of the present disclosure is to provide a simple and efficient process for the removal of chlorides from hydrocarbon.

Another object of the present disclosure is to provide a medium for removal of chlorides from hydrocarbon.

Other objects and advantages of the present disclosure will be more apparent from the following description, which is not intended to limit the scope of the present disclosure.

SUMMARY

In one aspect, the present disclosure provides an adsorbent composition for removing chlorides from hydrocarbon. The adsorbent composition comprises an adsorbent matrix and a metallic component, wherein the metallic component forms an intimate complex with the adsorbent matrix. The adsorbent composition is characterized by pore size in the range of 20 Å to 120 Å.

The adsorbent matrix is at least one selected from the group consisting of faujasite zeolite, silica, alumina, hydrotalcite and attapulgite. The amount of the adsorbent matrix is in the range of 15 wt. % to 99.5 wt. %.

The metallic component comprises compound/s of at least one metal selected from the group of metals consisting of alkali metals, alkaline earth metals, transition metals, post-transition metals and lanthanides. The metallic component comprises compound/s of at least one metal selected from the group of metals consisting of chromium (Cr), molybdenum (Mo), cobalt (Co), tungsten (W), cesium (Cs), zinc (Zn), sodium (Na), calcium (Ca), magnesium (Mg) and lanthanum (La). The amount of the metallic component is in the range of 0.5 wt. % to 50 wt. %.

The metallic component comprises compounds of at least one metal selected from the group of metals consisting of sodium (Na), calcium (Ca) and magnesium (Mg), wherein the metallic component is in the form of adsorbent material selected from the group consisting of faujasite zeolite, hydrotalcite and attapulgite.

The adsorbent composition further comprises a binder wherein the binder is at least one selected from the group consisting of kaolin and bentonite. The amount of the binder is in the range of 0.5 to 10 wt. %.

In second aspect, the present disclosure provides a process for preparing the adsorbent composition in accordance with one embodiment of the present disclosure. The process comprises the following steps:

(a) mixing an adsorbent matrix, a lubricating agent and a fluid medium to obtain an agglomerate;

(b) preparing shaped bodies front the agglomerate and drying the shaped bodies to obtain dried shaped bodies;

(c) calcining the dried shaped bodies to obtain formed bodies;

(d) impregnating a source of a metallic component in the formed bodies to obtain metal impregnated formed bodies; and (e) drying the metal impregnated formed bodies to obtain the adsorbent composition.

In another embodiment of the present disclosure, the process for preparing the adsorbent composition comprises the following steps:

(a) mixing an adsorbent matrix, a metallic component and/or a source of metallic component, a lubricating agent and a fluid medium to obtain an agglomerate;

(b) preparing shaped bodies from the agglomerate and drying the shaped bodies to obtain dried shaped bodies; and (c) calcining the dried shaped bodies to obtain the adsorbent composition.

The metallic component comprises compound/s of at least one metal selected from the group of metals consisting of sodium (Na), calcium (Ca) and magnesium (Mg), wherein the metallic component is in the form of adsorbent material selected from the group consisting of faujasite zeolite, hydrotalcite and attapulgite.

The source of the metallic component is at least one selected from the group of compounds consisting of cesium carbonate, cobalt nitrate, zinc nitrate, lanthanum carbonate and sodium tungstate.

The amount of the metallic component in the adsorbent composition is in the range of 0.5 wt. % to 50 wt. %.

The process further comprises adding a binder to the step of mixing, wherein the binder is at least one selected from the group consisting of kaolin and bentonite.

The lubricating agent is at least one selected from the group consisting of steric acid, palmetic acid, lubolic acid, calcium stearate and zinc stearate. The amount of the lubricating agent is in the range of 0.5 to 5 wt. %.

The fluid medium is at least one selected from the group consisting of water, orthophosphoric acid, acetic acid and nitric acid.

The step of calcination is performed at a temperature in the range of 400° C. to 800° C. for a time period in the range of 2 hours to 12 hours.

The shaped bodies are prepared in the form of spherical beads and extrudates. The spherical heads have diameter in the range of 2 mm to 6 mm. The extrudates have thickness in the range of 1 mm to 4 mm.

In third aspect, the present disclosure provides a process for removing chlorides from hydrocarbon. The process comprises contacting the hydrocarbon with the adsorbent composition of the present disclosure to obtain a mixture containing treated hydrocarbon, followed by separating the treated hydrocarbon to obtain treated hydrocarbon with reduced chloride content. The hydrocarbon is selected from the group consisting of cracked naphtha, straight run naphtha, aromatic rich reformate, off gas, and net gas.

DETAILED DESCRIPTION

The use of organic and inorganic chlorides in various refinery processes leads to the contamination of hydrocarbons with chloride ions. Various approaches have been employed to remove the chlorides from hydrocarbons, amongst which catalytic dehydrochlorination is one of the favored methods.

Catalytic dehydrochlorination is performed in the presence of catalyst wherein organic chloride compounds are transformed to alkene and hydrogen chloride. The method then eliminates hydrogen chloride by caustic treatment. One of the limitations of the mentioned process is the undesirable reaction of the reducible components of the hydrocarbon, such as unsaturated or oxygenated compounds. Another limitation involved is the complexity of the overall process.

The present disclosure envisages a process for catalytic dehydrochlorination of hydrocarbons along with in-situ adsorption of the generated hydrogen chloride. This process is operated at mild conditions and therefore, prevents the loss of unsaturated or oxygenated compounds present in the hydrocarbon.

In one aspect, the present disclosure provides an adsorbent composition for removing chlorides from hydrocarbon. The composition comprises an adsorbent matrix and a metallic component. The metallic component forms an intimate complex with the adsorbent matrix. In an embodiment, the adsorbent composition is characterized by pore size in the range of 20 Å to 120 Å

The adsorbent matrix is at least one selected from the group consisting of faujasite zeolite, silica, alumina, hydrotalcite and attapulgite. The amount of the adsorbent matrix is in the range of 15 wt. % to 99.5 wt. %.

In an embodiment, the metallic component comprises compound/s of at least one metal selected from the group of metals consisting of alkali metals, alkaline earth metals, transition metals, post transition metals and lanthanides. Typically, the metallic component comprises compound/s of at least one metal selected from the group of metals consisting of chromium (Cr), molybdenum (Mo), cobalt (Co), tungsten (W), cesium (Cs), zinc (Zn), sodium (Na), calcium (Ca), magnesium (Mg) and lanthanum (La).

Typically, the amount of the metallic component in the adsorbent composition is in the range of 0.5 wt. % to 50 wt. %.

In accordance with the first exemplary embodiment of the present disclosure, the adsorbent matrix is a mixture of faujasite zeolite and alumina.

In accordance with the second exemplary embodiment of the present disclosure, the adsorbent matrix is a mixture of faujasite zeolite, alumina and silica.

Typically, alumina is in the form of pseudoboehmite. Typically, silica is in the form of colloidal silica. Typically, the molar ratio of silicon (Si) to aluminum (Al) in faujasite zeolite is in the range of 1.4:1 to 3:1.

In accordance with the first exemplary embodiment of the present disclosure, the metallic component is a mixture of compounds of cobalt and cesium.

In accordance with the second exemplary embodiment of the present disclosure, the metallic component is a mixture of compounds of cesium, sodium and tungsten.

In one embodiment, the metallic component comprises compound/s of at least one metal selected from the group of metals consisting of zinc (Zn), sodium (Na), calcium (Ca), and magnesium (Mg), wherein the metallic component is in the form of adsorbent material selected from the group consisting of faujasite zeolite, hydrotalcite and attapulgite.

Faujasite zeolite comprises sodium, magnesium and calcium. Both hydrotalcite and attapulgite, comprise magnesium. Hence such compounds have properties of both catalyst and adsorbent.

Hence, the metallic component selected from the group consisting of faujasite zeolite, hydrotalcite and attapulgite acts as a catalyst as well as an adsorbent matrix.

In accordance with the third exemplary embodiment of the present disclosure, the metallic component is hydrotalcite. Typically, hydrotalcite comprises the weight ratio of magnesium oxide (MgO) to alumina ($Al_2O_3$) is in the range of 2:1 to 10:1. Preferably, hydrotalcite having MgO to $Al_2O_3$ ratio of 4.5:1 is used for preparing the adsorbent composition. The surface area of hydrotalcite is in the range of 5 $m^2/g$ to 15 $m^2/g$. Typically, the surface area of hydrotalcite is 11 $m^2/g$.

In accordance with the fourth exemplary embodiment of the present disclosure, the metallic component is a mixture of hydrotalcite and compounds of lanthanum.

In an embodiment, the adsorbent composition further comprises a binder, wherein the binder is at least one selected from the group consisting of kaolin and bentonite. Typically, the amount of the binder is in the range of 0.5 to 10 wt. %.

In second aspect, the present disclosure provides a process for preparing the adsorbent composition. The process comprises the following steps:
 (a) mixing an adsorbent matrix, a lubricating agent and a fluid medium to obtain an agglomerate;
 (b) preparing shaped bodies from the agglomerate and drying the shaped bodies to obtain dried shaped bodies;
 (c) calcining the dried shaped bodies to obtain formed bodies;
 (d) impregnating a source of a metallic component in the formed bodies to obtain metal impregnated formed bodies; and
 (e) drying the metal impregnated formed bodies to obtain the adsorbent composition.

In third aspect, the present disclosure provides a process for preparing the adsorbent composition. The process comprises the following steps:
(a) mixing an adsorbent matrix, a metallic component and/or a source of metallic component, a lubricating agent and a fluid medium to obtain an agglomerate;
(b) preparing shaped bodies from the agglomerate and drying the shaped bodies to obtain dried shaped bodies; and
(c) calcining the dried shaped bodies to obtain the adsorbent composition.

In accordance with an embodiment of the present disclosure, the process includes directly adding the metallic component and/or source of the metallic component in the step of mixing.

In accordance with another embodiment of the present disclosure, the process includes adding the source of the metallic component during the impregnation step after the calcination of dried shaped bodies.

In accordance with another embodiment of the present disclosure, the process includes adding the metallic component and/or source of the metallic component in the step of mixing and further adding the source of the metallic component during the impregnation step after the calcination of dried shaped bodies.

Typically, the amount of the metallic component incorporated in the adsorbent composition by this process is in the range of 0.5 wt. % to 50 wt. %.

In one embodiment, the metallic component comprises compounds of at least one metal selected from the group of metals consisting of sodium (Na), calcium (Ca) and magnesium (Mg), wherein the metallic component is in the form of adsorbent material selected from the group consisting of faujasite zeolite, hydrotalcite and attapulgite.

Typically, the source of the metallic component is at least one selected from the group of compounds consisting of cesium carbonate, cobalt nitrate, zinc nitrate, lanthanum carbonate and sodium tungstate.

Typically, the processes as disclosed above further comprise addition of a binder during the step of mixing. Typically, the binder is at least one selected from the group consisting of kaolin and bentonite.

Typically, the lubricating agent is at least one selected from the group consisting of steric acid, palmetic acid, lubolic acid, calcium stearate and zinc stearate. In an embodiment, the amount of the lubricating agent is in the range of 0.5 to 5 wt. %.

Typically, the fluid medium is at least one selected from the group consisting of water, orthophosphoric acid, acetic acid and nitric acid.

The step of calcination is performed at a temperature in the range of 400° C. to 800° C. for a time period in the range of 2 hours to 12 hours.

In an embodiment, the shaped bodies are prepared in the form of spherical beads and extrudates. Typically, the spherical beads have diameter in the range of 2 mm to 6 mm, wherein the extrudates have thickness in the range of 1 mm to 4 mm.

The adsorbent composition of the present disclosure is found to be water-stable. It is observed that, when the adsorbent composition is placed in wafer (in an amount 10 times the amount of the adsorbent composition) for 12 hours, the adsorbent composition does not develop crack/s or gets damaged.

In fourth aspect, the present disclosure provides a process for removing chlorides from hydrocarbon. The process comprises contacting the hydrocarbon with the adsorbent composition of the present disclosure for a predetermined time to obtain a mixture containing treated hydrocarbon, followed by separating the treated hydrocarbon to obtain treated hydrocarbon with reduced chloride content. Typically, the pre-determined time is in the range of 2 to 20 hours. In an embodiment, the pre-determined time is 20 hours.

Typically, the hydrocarbon is selected from the group consisting of cracked naphtha, straight run naphtha, aromatic rich reformate, off gas and net gas.

Thus, the process for removal of chlorides from the hydrocarbon using the adsorbent composition of the present disclosure is simple, efficient and economical.

The extent of removal of chlorides from the hydrocarbon is either partial or complete.

In accordance with one embodiment of the present disclosure, the chloride removal capacity of the adsorbent composition of the present disclosure is analyzed with the help of hydrocarbon having organic chloride content of 147 ppm. It is found that the amount of chlorides removed by the adsorbent composition is in the range of 0.020 wt. % to 0.047 wt. %.

The organic chloride used for this analysis is 1-chlorobutane. It is observed that 1-chlorobutane is converted to 1-butene and hydrogen chloride. The hydrogen chloride is adsorbed by the adsorbent composition.

In a similar way, other organic halides are converted into corresponding alkenes and hydrogen chloride by the adsorbent composition.

The present disclosure is further described in light of the following experiments which are set forth for illustration purpose only and not to be construed for limiting the scope of the disclosure. The following experiments can be sealed up to industrial/commercial scale and the results obtained can be extrapolated to industrial scale.

EXPERIMENT

Example 1

Faujasite zeolite powder (50 g) was mixed with alumina powder (35 g), colloidal silica (6 g), cobalt nitrate (1 g), cesium carbonate (1 g) and bentonite powder (7 g) to obtain a mixture. Water (~35 ml) was added to the mixture, and the resultant mixture was pugged and kneaded to obtain agglomerate from which shaped bodies (extrudates and spherical beads) were prepared.

Extrudates having average thickness of 2 mm were prepared from the agglomerate using an extruder. Further, spherical beads having average diameter of 4 mm were prepared front the agglomerate using a pan granulator.

The shaped bodies (extrudates and spherical beads) were air dried to obtain dried shaped bodies, followed by calcination at 660° C. for 6 hours to obtain adsorbent composition.

The mechanical properties of the adsorbent composition were analysed. Extrudates were found to have crushing strength of 5 Kgf/cm$^2$. The bulk density of the adsorbent composition was 0.5 g/cc, BET surface area was 414 m$^2$/g, and the average pore size was 37 Å.

The capacity of the adsorbent composition to remove chlorides from hydrocarbon was analysed. A hydrocarbon feed (4 g) containing 147 ppm organic chloride (1-chlorobutane) was contacted with the adsorbent composition (1 g) for 12 hours. The chloride content of the treated hydrocarbon was measured with the help of chloride analyser working on the principle of coulemetric titration. Percentage removal of organic chloride from the hydrocarbon was found to be 66%. Total chloride adsorbed by the adsorbent composition was found to be 0.035 weight %.

Example 2

Faujasite zeolite powder (50 g) was mixed with alumina powder (35 g), colloidal silica (6 g), cobalt nitrate (1 g), zinc nitrate (1 g) and bentonite powder (7 g) to obtain a mixture. Fluid medium comprising water (88 g), acetic acid (10 g), and lubolic acid (2 g) was mixed with the mixture using spraying technique and the resultant mixture was pugged and kneaded to obtain an agglomerate from which shaped bodies (extrudates and spherical beads) were prepared.

Extrudates having average thickness of 2 mm were prepared from the agglomerate using an extruder. Further, spherical beads having average diameter 4 mm were prepared from the agglomerate using a pan granulator.

Shaped bodies (extrudates and spherical beads) were air dried to obtain dried shaped bodies and the dried shaped bodies were calcined at 660° C. for 6 hours to obtain adsorbent composition.

The mechanical properties of the adsorbent composition were analysed. Extrudates were found to have crashing strength of 5.3 Kgf/cm$^2$. The bulk density of the adsorbent composition was 0.53 g/cc, BET surface area was 420 m$^2$/g, and the average pore size was 37 Å.

The capacity of the adsorbent composition to remove chlorides from hydrocarbon was analysed. A hydrocarbon feed (4 g) containing organic chloride (1-chlorobutane) 147 ppm was contacted with the adsorbent composition (1 g) for 12 hours. The chloride content of the treated hydrocarbon was measured with the help of chloride analyser working on the principle of coulemetric titration. Total chloride adsorbed by the adsorbent composition was found to be 0.033 weight %.

Further, the shaped bodies were kept in contact with a mixture of nitrogen and HCl (500 ppm) for 12 hours. Total chloride adsorbed by the adsorbent composition was found to be 14%.

Example 3

Faujasite zeolite powder (50 g) was mixed with alumina powder (35 g), colloidal silica (6 g), cobalt nitrate (1 g), lanthanum carbonate (1 g) and bentonite powder (7 g) to obtain a mixture. A fluid medium comprising water (88 g), orthophosphoric acid (10 g), and lubolic acid (2 g) was mixed with the mixture using spraying technique, and the resultant mixture was pugged and kneaded to obtain an agglomerate from which shaped bodies (extrudates and spherical beads) were prepared.

Extrudates having average thickness of 2 mm were prepared from the agglomerate using an extruder. Further, spherical beads having average diameter 4 mm were prepared from the agglomerate using a pan granulator.

Shaped bodies (extrudates and spherical beads) were air dried to obtain dried shaped bodies followed by calcination at 660° C. for 6 hours to obtain adsorbent composition.

The mechanical properties of the adsorbent composition were analysed. Extrudates were found to have crushing strength of 5.4 Kgf/cm$^2$. The bulk density of the adsorbent composition was 0.54 g/cc, BET surface area was 418 m$^2$/g, and the average pore size was 36 Å.

The capacity of the adsorbent composition to remove chlorides from hydrocarbon was analysed. A hydrocarbon feed (4 g) containing organic chloride (1-chlorobutane) 147 ppm was contacted with the adsorbent composition (1 g) for 12 hours. The chloride content of the treated hydrocarbon was measured with the help of chloride analyzer working on the principle of coulemetric titration. Total chloride adsorbed by the adsorbent composition was found to be 0.035 weight %.

Further, the shaped bodies were kept in contact with a mixture of nitrogen and HCl (500 ppm) for 12 hours. The chloride analysis of the treated gas was done using Mohr's method. The chloride adsorption capacity of the adsorbent composition was found to be 18%.

Example 4

Hydrotalcite powder (50 g) was mixed with alumina (50 g) powder on dry basis to obtain a mixture. A fluid medium comprising water (88 g), acetic acid (10 g), and lubolic acid (2 g) was mixed with the mixture using spraying technique and the resultant mixture was pugged and kneaded to obtain an agglomerate from which shaped bodies (extrudates and spherical beads) were prepared.

Extrudates having average thickness in the range of 2 mm were prepared from the agglomerate using an extruder. Further, spherical beads having average diameter 4 mm were prepared from the agglomerate using a pan granulator.

Shaped bodies (extrudates and spherical beads) were air dried to obtain dried shaped bodies followed by calcination at 550° C. for 5 hours to obtain adsorbent composition.

The mechanical properties of the adsorbent composition were analysed. Extrudates were found to have crushing strength of 3 Kgf/cm$^2$. The bulk density of the shaped bodies was 0.56 g/cc, BET surface area was 213 m$^2$/g, and the average pore size was 80 Å.

The capacity of the adsorbent composition to remove chlorides from hydrocarbon was analysed. A hydrocarbon feed (4 g) containing organic chloride (1-chlorobutane) 147 ppm was contacted with the adsorbent composition (1 g) for 12 hours. The chloride content of the treated hydrocarbon was measured with the help of chloride analyser working on the principle of coulemetric titration. Total chloride adsorbed by the adsorbent composition was found to be 0.044 weight %.

Further, the shaped bodies were kept in contact with a mixture of nitrogen and HCl (500 ppm) for 12 hours. Chloride analysis of the treated gas was done using Mohr's method. The chloride adsorption capacity of the adsorbent composition was 28%.

Example 5

Hydrotalcite powder (80 g) was mixed with attapulgite (20 g) powder to obtain a mixture. A fluid medium comprising water (88 g), acetic acid (10 g), and lubolic acid (2 g) was mixed with the mixture using spraying technique and the resultant mixture was pugged and kneaded to obtain an agglomerate from which shaped bodies (extrudates and spherical beads) were prepared.

Extrudates having average thickness in the range of 2 mm were prepared from the agglomerate using an extruder. Further, spherical beads having average diameter of 4 mm were prepared from the agglomerate using a pan granulator.

Shaped bodies (extrudates and spherical beads) were air dried to obtain dried shaped bodies followed by calcination at 650° C. for 6 hours to obtain adsorbent composition.

The mechanical properties of the adsorbent composition were analysed. The Extrudates were found to have crushing strength of 1.5 Kgf/cm$^2$. The bulk density of the adsorbent composition was 0.30 g/cc, BET surface area was 175 m$^2$/g, and the average pore size was 103 Å.

The capacity of the adsorbent composition to remove chlorides from hydrocarbon was analysed. A hydrocarbon feed (4 g) containing organic chloride (1-chlorobutane) 147 ppm was contacted with adsorbent composition (1 g) for 12 hours. The chloride content of the treated hydrocarbon was measured with the help of chloride analyser working on the principle of coulemetric titration. Total chloride adsorbed by the adsorbent composition was found to be 0.020 weight %.

Further, the shaped bodies were kept in contact with a mixture of nitrogen and HCl (500 ppm) for 12 hours. Chloride analysis of the treated gas was done using Mohr's method. The chloride adsorption capacity of the adsorbent composition was 18%.

Example 6

Faujasite zeolite powder (60 g) was mixed with hydrotalcite powder (30 g), zinc stearate (1 g), lanthanum carbonate (1 g) and bentonite powder (8 g) to obtain a mixture. A fluid medium comprising water (88 g), acetic acid (10 g), and lubolic acid (2 g) was mixed with the mixture using spraying technique, and the resultant mixture was pugged and kneaded to obtain an agglomerate from which shaped bodies (extrudates and spherical beads) were prepared.

Extrudates having average thickness of 2 mm were prepared from the agglomerate using an extruder. Further, spherical beads having average diameter of 4 mm were prepared from the agglomerate using a pan granulator.

Shaped bodies (extrudates and spherical beads) were air dried to obtain dried shaped bodies followed by calcination at 550° C. for 6 hours to obtain adsorbent composition.

The mechanical properties of the adsorbent composition were analysed. Extrudates were found to have crashing strength of 3 Kgf/cm$^2$. The bulk density of the adsorbent composition was 0.56 g/cc, BET surface area was 408 m$^2$/g, and the average pore size was 25 Å.

The capacity of the adsorbent composition to remove chlorides from hydrocarbon was analysed. A hydrocarbon feed (4 g) containing organic chloride (1-chlorobutane) 147 ppm was contacted with the adsorbent composition (1 g) for 12 hours. The chloride content of the treated hydrocarbon was measured with the help of chloride analyser working on the principle of coulemetric titration. Total chloride adsorbed by the adsorbent composition was found to be 0.030 weight %.

Further, the shaped bodies were kept in contact with a mixture of nitrogen and HCl (500 ppm) for 12 hours. Chloride analysis of the treated gas was done using Mohr's method. The chloride adsorption capacity of the adsorbent composition was 23%.

Example 7

Alumina powder (100 g) was mixed with a fluid medium comprising water (88 g), acetic acid (10 g), and lubolic acid (2 g) using spraying technique and the resultant mixture was pugged and kneaded to obtain an agglomerate from which shaped bodies (extrudates and spherical beads) were prepared.

Extrudates having average thickness of 2 mm were prepared from the agglomerate using an extruder. Further, spherical beads having average diameter of 4 mm were prepared from the agglomerate using a pan granulator.

Shaped bodies (extrudates and spherical beads) were air dried to obtain dried shaped bodies followed by calcination at 550° C. for 5 hours to obtain formed bodies.

The formed bodies were impregnated with (a) an 8 wt % aqueous solution (100 ml) of cesium carbonate, followed by (b) an 8 wt % aqueous solution (100 ml) of sodium tungstate to obtain metal impregnated formed bodies. The metal impregnated formed bodies were dried to obtain adsorbent composition.

The mechanical properties of the shaped bodies were analysed. Extrudates were found to have crushing strength of 9 Kgf/cm$^2$. The bulk density of the formed bodies was 0.75 g/cc, BET surface area was 200 m$^2$/g, and the average pore size was 97 Å.

The capacity of the adsorbent composition to remove chlorides from hydrocarbon was analysed. A hydrocarbon feed (4 g) containing organic chloride (1-chlorobutane) 147 ppm was contacted with the adsorbent composition (1 g) for 12 hours. The chloride content of the treated hydrocarbon was measured with the help of chloride analyser working on the principle of coulemetric titration. Total chloride adsorbed by the adsorbent composition was found to be 0.047 weight %.

Further, the shaped bodies were kept in contact with a mixture of nitrogen and HCl (500 ppm) for 12 hours. The chloride analysis of the treated gas was done using Mohr's method. The chloride adsorption capacity of the adsorbent composition was 17%.

Example 8

Alumina powder (100 g) was mixed with a fluid medium comprising water (88 g), nitric acid (10 g), and lubolic acid (2 g) using spraying technique and the resultant mixture was pugged and kneaded to obtain an agglomerate from which shaped bodies (extrudates and spherical beads) were prepared.

Extrudates having average thickness of 2 mm were prepared from the agglomerate using an extruder. Further, spherical beads having average diameter of 4 mm were prepared from the agglomerate using a pan granulator.

Shaped bodies (extrudates and spherical beads) were air dried to obtain dried shaped bodies followed by calcination at 550° C. for 5 hours to obtain formed bodies.

The formed bodies was impregnated with (a) an 8 wt % aqueous solution (100 ml) of cesium carbonate, followed by (b) an 8 wt % aqueous solution (100 ml) of sodium tungstate to obtain metal impregnated formed bodies. The metal impregnated framed bodies were dried to obtain adsorbent composition.

The mechanical properties of the shaped bodies were analysed. Extrudates were found to have crushing strength of 9 Kgf/cm$^2$. The hulk density of the formed bodies was 0.75 g/cc, BET surface area was 205 m$^2$/g, and the average pore size was 96 Å.

The capacity of the adsorbent composition to remove chlorides from hydrocarbon was analysed. Hydrocarbon feed (4 g) containing organic chloride (1-chlorobutane) 147 ppm was contacted with adsorbent composition (1 g) for 12 hours. The chloride content of the treated hydrocarbon was measured with the help of chloride analyser working on the principle of coulemetric titration. Total chloride adsorbed by the adsorbent composition was found to be 0.047 weight %.

Further, the shaped bodies were kept in contact with a mixture of nitrogen and HCl (500 ppm) for 12 hours. The chloride analysis of the treated gas was done using Mohr's method. The chloride adsorption capacity of the adsorbent composition was 17%.

Adsorbent composition obtained in experiments 7 and 8 were prepared using only alumina as adsorbent, and the formed bodies were impregnated with the metal salts. These adsorbent compositions were also found to have higher crashing strength.

TECHNICAL ADVANCEMENTS

The present disclosure described herein above has several technical advantages including, but not limited to, the realization of:
- a simple process for removal of chlorides from hydrocarbon; and
- an adsorbent composition for removal of chlorides from hydrocarbon.

Throughout this specification the word "comprise", or variations such as "comprises" or "comprising", will be understood to imply the inclusion of a stated element, integer or step, or group of elements, integers or steps, but not the exclusion of any other element, integer or step, or group of elements, integers or steps.

The use of the expression "at least" or "at least one" suggests the use of one or more elements or ingredients or quantities, as the use may be in the embodiment of the invention to achieve one or more of the desired objects or results. While certain embodiments of the inventions have been described, these embodiments have been presented by way of example only, and are not intended to limit the scope of the inventions. Variations or modifications to the formulation of this invention, within the scope of the invention, may occur to those skilled in the art upon reviewing the disclosure herein. Such variations or modifications are well within the spirit of this invention.

The numerical values given for various physical parameters, dimensions and quantities are only approximate values and it is envisaged that the values higher than the numerical value assigned to the physical parameters, dimensions and quantities fall within the scope of the invention unless there is a statement in the specification to the contrary.

While considerable emphasis has been placed herein on the specific features of the preferred embodiment, it will be appreciated that many additional features can be added and that many changes can be made in the preferred embodiment without departing from the principles of the disclosure. These and other changes in the preferred embodiment of the disclosure will be apparent to those skilled in the art from the disclosure herein, whereby it is to be distinctly understood that the foregoing descriptive matter is to be interpreted merely as illustrative of the disclosure and not as a limitation.

The invention claimed is:

1. An adsorbent composition for removing chlorides from hydrocarbon, the adsorbent composition comprising an adsorbent matrix and a metallic component, wherein said metallic component forms an intimate complex with the adsorbent matrix; wherein the absorbent matrix is at least one selected from the group consisting of faujasite, zeolite, silica, alumina, hydrotalcite wherein the amount of the absorbent matrix is in the range of 15 wt. % to 99.5 wt. %; and wherein the amount of the metallic component is in the range 0.5 wt. % to 50 wt. % and wherein the adsorbent composition is characterized by pore size in the range of 20 .ANG. to 120 .ANG.

2. The adsorbent composition as claimed in claim 1, wherein the metallic component comprises compound/s of at least one metal selected from the group of metals consisting of alkali metals, alkaline earth metals, transition metals, post transition metals, and lanthanides.

3. The adsorbent composition as claimed in claim 2, wherein the metallic component comprises compound/s of at least one metal selected from the group of metals consisting of chromium (Cr), molybdenum (Mo), cobalt (Co), tungsten (W), cesium (Cs), zinc (Zn), sodium (Na), calcium (Ca), magnesium (Mg) and lanthanum (La).

4. The adsorbent composition as claimed in claim 1, wherein the metallic component comprises compounds of at least one metal selected from the group of metals consisting of sodium (Na), calcium (Ca) and magnesium (Mg), wherein the metallic component is in the form of adsorbent material selected from the group consisting of faujasite zeolite, hydrotalcite and attapulgite.

5. The adsorbent composition as claimed in claim 1 further comprising a binder; the binder is at least one selected from the group consisting of kaolin and bentonite, wherein the amount of the binder is in the range of 0.5 wt. % to 10 wt. %.

6. A process for preparing the adsorbent composition as claimed in claim 1, said process comprising the following steps: (a) mixing an adsorbent matrix, a lubricating agent and a fluid medium to obtain an agglomerate; (b) preparing shaped bodies from the agglomerate and drying the shaped bodies to obtain dried shaped bodies; (c) calcining the dried shaped bodies to obtain formed bodies; (d) impregnating a source of a metallic component in the formed bodies to obtain metal impregnated formed bodies; and (e) drying the metal impregnated formed bodies to obtain the adsorbent composition.

7. A process for preparing the adsorbent composition as claimed in claim 1, said process comprising the following steps: (a) mixing an adsorbent matrix, a metallic component and/or a source of metallic component, a lubricating agent and a fluid medium to obtain an agglomerate; (b) preparing shaped bodies from the agglomerate and drying the shaped bodies to obtain dried shaped bodies; and (c) calcining the dried shaped bodies to obtain the adsorbent composition.

8. The process as claimed in claim 6, wherein the source of the metallic component is at least one selected from the group of compounds consisting of cesium carbonate, cobalt nitrate, zinc nitrate, lanthanum carbonate and sodium tungstate.

9. The process as claimed in claim 6, wherein said process further comprises adding a binder to the step (a) of mixing, wherein the binder is at least one selected from the group consisting of kaolin and bentonite.

10. The process as claimed in claim 6, wherein the lubricating agent is at least one selected from the group consisting of steric acid, palmetic acid, lubolic acid, calcium stearate, and zinc stearate; wherein the amount of the lubricating agent is in the range of 0.5 to 5 wt. %.

11. The process as claimed in claim 6, wherein the fluid medium is at least one selected from the group consisting of water, orthophosphoric acid, acetic acid and nitric acid.

12. The process as claimed in claim 6, wherein the step (c) of calcination is performed at a temperature in the range of 400 .degree. C. to 800 .degree. C. for a time period in the range of 2 hours to 12 hours.

13. The process as claimed in claim 6, wherein in step (b), the shaped bodies are prepared in the form of spherical beads and extrudates, wherein the spherical beads have diameter in the range of 2 mm to 6 mm, wherein the extrudates have thickness in the range of 1 mm to 4 mm.

14. The process as claimed in claim 7, wherein the source of the metallic component is at least one selected from the group of compounds consisting of cesium carbonate, cobalt nitrate, zinc nitrate, lanthanum carbonate and sodium tungstate.

15. The process as claimed in claim 7, wherein said process further comprises adding a binder to the step (a) of mixing, wherein the binder is at least one selected from the group consisting of kaolin and bentonite.

16. The process as claimed in claim 7, wherein the lubricating agent is at least one selected from the group consisting of steric acid, palmetic acid, lubolic acid, calcium stearate, and zinc stearate; wherein the amount of the lubricating agent is in the range of 0.5 to 5 wt. %.

17. The process as claimed in claim 7, wherein the fluid medium is at least one selected from the group consisting of water, orthophosphoric acid, acetic acid and nitric acid.

18. The process as claimed in claim 7, wherein the step (c) of calcination is performed at a temperature in the range of 400 .degree. C. to 800 .degree. C. for a time period in the range of 2 hours to 12 hours.

19. The process as claimed in claim 7, wherein in step (b), the shaped bodies are prepared in the form of spherical beads and extrudates, wherein the spherical beads have diameter in the range of 2 mm to 6 mm, wherein the extrudates have thickness in the range of 1 mm to 4 mm.

* * * * *